United States Patent
Grubner et al.

(10) Patent No.: US 10,284,838 B2
(45) Date of Patent: May 7, 2019

(54) METHOD AND APPARATUS FOR TRANSMITTING IMAGES CAPTURED BY FIRST AND SECOND IMAGE SENSORS

(71) Applicant: TITAN MEDICAL INC., Toronto (CA)

(72) Inventors: George Grubner, Southbridge, MA (US); Paul Nickelsberg, Maynard, MA (US)

(73) Assignee: Titan Medical Inc. (CA)

( * ) Notice: Subject to any disclaimer, the term of this patent is extended or adjusted under 35 U.S.C. 154(b) by 100 days.

(21) Appl. No.: 15/677,307

(22) Filed: Aug. 15, 2017

(65) Prior Publication Data

US 2018/0054605 A1 Feb. 22, 2018

Related U.S. Application Data

(60) Provisional application No. 62/377,080, filed on Aug. 19, 2016.

(51) Int. Cl.
| | |
|---|---|
| *H04N 19/00* | (2014.01) |
| *H04N 13/161* | (2018.01) |
| *H04N 13/194* | (2018.01) |
| *H04N 13/239* | (2018.01) |
| *H04N 13/296* | (2018.01) |

(52) U.S. Cl.
CPC ......... *H04N 13/161* (2018.05); *H04N 13/194* (2018.05); *H04N 13/239* (2018.05); *H04N 13/296* (2018.05); *H04N 19/00* (2013.01)

(58) Field of Classification Search
CPC .. H04N 13/161; H04N 13/296; H04N 13/194; H04N 13/239; H04N 19/00
See application file for complete search history.

(56) References Cited

U.S. PATENT DOCUMENTS

| | | | | | |
|---|---|---|---|---|---|
| 5,454,725 | A | * | 10/1995 | Speiser | H01R 31/06 439/61 |
| 5,995,512 | A | * | 11/1999 | Pogue, Jr. | H04L 29/06 370/419 |
| 2003/0156649 | A1 | * | 8/2003 | Abrams, Jr. | G11B 27/034 375/240.24 |
| 2007/0230640 | A1 | * | 10/2007 | Bryan | H04L 25/03057 375/349 |
| 2010/0254617 | A1 | * | 10/2010 | Hwang | G06T 3/602 382/232 |

(Continued)

*Primary Examiner* — Huy T Nguyen
(74) *Attorney, Agent, or Firm* — Knobbe, Martens, Olson & Bear, LLP

(57) ABSTRACT

Methods and apparatuses for transmitting images captured by first and second image sensors are disclosed. In some embodiments, each image sensor generates a plurality of pixel values each represented by a plurality of data bits having a pixel bit length. In some embodiments, a method involves combining pixel values generated by each of the first and second image sensors into a single image data stream, transforming the single image data stream into a plurality of data words having a word bit length, and encoding the data by selection of one of a plurality of symbols having an encoded bit length that is at least one bit longer than the word bit length to reduce a running disparity. The method also involves serializing the symbols to generate and transmit a DC balanced serial bitstream. Methods for synchronizing a receiver for extracting image data from the serial bitstream are also disclosed.

27 Claims, 6 Drawing Sheets

(56) References Cited

U.S. PATENT DOCUMENTS

| | | | |
|---|---|---|---|
| 2011/0194651 A1* | 8/2011 | Hayasaka | H04L 7/042 375/340 |
| 2011/0242355 A1 | 10/2011 | Goma et al. | |
| 2013/0176409 A1 | 7/2013 | Kotani et al. | |
| 2016/0261375 A1* | 9/2016 | Roethig | H04L 1/0083 |

* cited by examiner

METHOD AND APPARATUS FOR TRANSMITTING IMAGES CAPTURED BY FIRST AND SECOND IMAGE SENSORS

BACKGROUND

1. Field

This disclosure relates generally to transmitting image data representing images and more particularly to transmitting image data representing images captured by first and second image sensors in a single bitstream.

2. Description of Related Art

Stereoscopic cameras may be used within confined spaces to provide a 3D perspective view of a region. For example, in robotic surgery and endoscope applications a small bore stereoscopic camera may be inserted into a body cavity to provide a surgeon with a stereoscopic view of a surgical site. Images are generated by a pair of sensors associated with the camera and may be transmitted over a data link to a remotely located receiver that produces display signals for driving display that is capable of providing 3D views. In applications where the sensors are high definition (HD) capable sensors, a substantial quantity of image data may be generated for each image and when the frame rate is relatively high, transmission of the image data transmission presents some problems. Further in surgical and other systems, it is desirable to reduce the latency between the image sensors and the display to a minimum so that the surgeon does not perceive a time lag between actual movements within the body cavity and the representation of these movements on the 3D display.

SUMMARY

In accordance with one disclosed embodiment there is provided a method for transmitting images captured by first and second image sensors having different perspective viewpoints within an object field, each image sensor generating a plurality of pixel values each represented by a plurality of data bits having a pixel bit length. The method involves combining pixel values generated by each of the first and second image sensors into a single image data stream including an ordered plurality of pixel values including pixel values generated by the first image sensor and pixel values generated by the second image sensor. The method also involves transforming the single image data stream into a plurality of data words, each data word having a word bit length. The method further involves encoding the data words using an encoding scheme that encodes each data word by selection of one of a plurality of symbols representing the data word, the symbols each having an encoded bit length that is at least one bit longer than the word bit length, the symbol selection being made to reduce a running disparity associated with the symbols. The method also involves serializing the symbols to generate a DC balanced serial bitstream, and transmitting the serial bitstream.

The word bit length may be the same as the pixel bit length.

The word bit length may differ from the pixel bit length, and the method may further involve grouping a plurality of data words into data sequences prior to the encoding, the grouping being selected to cause the data sequence to have a bit length that is a multiple of the word bit length.

The pixel bit length may be 12 bits, the word bit length may be 8 bits, and the encoded bit length may be 10 bits.

The serial bitstream may include successive 40 bit data sequences including four encoded 10 bit symbols, and three successive 40 bit data sequences may be used to encode three successive 32 bit data words, the three 32 bit data words each including four pixel values generated by the first image sensor and four pixel values generated by the second image sensor.

The encoding scheme may be an 8B10B encoding scheme.

Encoding the data words may involve encoding the data words using an encoding scheme that provides sufficient transition density to facilitate clock recovery from the bitstream.

The method may involve causing a synchronization pattern to be inserted into the bitstream, the synchronization pattern being operable to facilitate extraction of pixel values from the bitstream.

The synchronization pattern may include at least a first synchronization pattern for facilitating determination of bit boundaries in the bitstream for extracting the symbols from the bitstream, and a second synchronization pattern for identifying groups of data words associated with the ordered plurality of pixel values produced by the first and second image sensors.

The synchronization pattern may further involve a third synchronization pattern for separating pairs of pixel values within successive identified groups of data words, each pair of pixel values including one pixel value produced by the first image sensor and one pixel value produced by the second image sensor.

Causing the synchronization pattern to be inserted may involve causing the synchronization pattern to be inserted into the bitstream in response to receiving a synchronization command.

Transmitting the bitstream may involve transmitting the bitstream using pseudo emitter coupled logic to generate a differential signal for transmission over a pair of signal conductors.

The method may involve receiving a reference clock signal from a receiver for synchronizing timing of the transmission of the images.

Transmitting the bitstream may involve transmitting the bitstream at a baud rate that is a multiple of a clock rate of the reference clock signal.

In accordance with another disclosed embodiment there is provided a method for synchronizing a receiver for extracting image data from a received bitstream, the bitstream including symbols having a first bit length and encoding image data representing images captured by first and second image sensors having different perspective viewpoints within an object field, the image data including pixel values generated by each of the first and second image sensors. The method involves, in response to detecting a bit pattern in the bitstream that corresponds to at least a portion of a predefined first synchronization pattern, using the first synchronization pattern to determine bit boundaries for extracting the symbols from the bitstream. The method further involves decoding the extracted symbols to produce a data stream including a plurality of data words having a second bit length, the first bit length being longer than the second bit length by at least one bit included to facilitate DC balancing of the bitstream for transmission. The method also involves, in response to detecting one or more data words in the data stream having a bit pattern that corresponds to at least a portion of a predefined second synchronization pattern, using the second synchronization pattern to identify groups of data words associated with an ordered plurality of pixel values produced by the first and second image sensors.

The pixel values may have a bit length equal to the second bit length and each group of data words may include at least one pair of pixel values including one pixel value produced by the first image sensor and one pixel value produced by the second image sensor.

The pixel values may have a bit length differing from the second bit length and the method may further involve, in response to detecting one or more data words in the data stream that correspond to at least a portion of a predefined third synchronization pattern, using the third synchronization pattern to separate pairs of pixel values within successive identified groups of data words, each pair of pixel values including one pixel value produced by the first image sensor and one pixel value produced by the second image sensor.

The first synchronization pattern and the second synchronization pattern may include a sequence of bits in the respective bit patterns that is unlikely to be encountered within the image data.

The first synchronization pattern may include one of a plurality of successive bits having a binary value of 0 and a plurality of successive bits having a binary value of 1.

The receiver may generates a clock signal for synchronizing receiver functions and may further involve causing the clock signal to be synchronized with the bitstream, the bitstream having being encoded to have a sufficient transition density to facilitate clock recovery from the bitstream.

The symbols encoding the image data may include symbols selected to maintain DC-balance for transmission of the bitstream.

The bitstream may be received from a transmitter located proximate the first and second image sensors and the method may further involve causing the receiver to transmit a synchronization command to the transmitter to elicit transmission of the first synchronization pattern and the second synchronization pattern within the bitstream.

Causing the receiver to transmit the synchronization command may involve causing the receiver to transmit a synchronization command when initiating operations for receiving image data or when detecting loss of synchronization of the bitstream at the receiver.

The pixel values each include horizontal and vertical synchronization bits that may be used to produce respective horizontal and vertical synchronization pulses in a display signal generated based on the image data, and detecting loss of synchronization of the bitstream may involve detecting loss of valid horizontal and vertical synchronization pulses signals in the display signal.

In accordance with another disclosed embodiment there is provided an interface apparatus for transmitting images captured by first and second image sensors having different perspective viewpoints within an object field, each image sensor generating a plurality of pixel values each represented by a plurality of data bits having a pixel bit length. The apparatus includes a multiplexer for combining pixel values generated by each of the first and second image sensors into a single image data stream including an ordered plurality of pixel values including pixel values generated by the first image sensor and pixel values generated by the second image sensor. The apparatus also includes an encoder operably configured to transform the single image data stream into a plurality of data words, each data word having a word bit length. The encoder is also operably configured to encode the data words using an encoding scheme that encodes each data word by selection of one of a plurality of symbols representing the data word, the symbols each having an encoded bit length that is at least one bit longer than the word bit length, the symbol selection being made to reduce a running disparity associated with the symbols. The apparatus further includes a serializer operably configured to serialize the symbols to generate a DC balanced serial bitstream, and a waveform generator for transmitting the serial bitstream.

The word bit length may differ from the pixel bit length, and the encoder may be operably configured to group a plurality of data words into data sequences prior to the encoding, the grouping being selected to cause the data sequence to have a bit length that is a multiple of the word bit length.

In accordance with another disclosed embodiment there is provided an apparatus for receiving and extracting image data from a received bitstream, the bitstream including symbols having a first bit length and encoding image data representing images captured by first and second image sensors having different perspective viewpoints within an object field, the image data including pixel values generated by each of the first and second image sensors. The apparatus includes a decoder operably configured to detect a bit pattern in the bitstream that corresponds to at least a portion of a predefined first synchronization pattern, and in response to use the first synchronization pattern to determine bit boundaries for extracting the symbols from the bitstream. The decoder is also operably configured to decode the extracted symbols to produce a data stream including a plurality of data words having a second bit length, the first bit length being longer than the second bit length by at least one bit included to facilitate DC balancing of the bitstream for transmission. The apparatus also includes a de-multiplexer operably configured to detect one or more data words in the data stream having a bit pattern that corresponds to at least a portion of a predefined second synchronization pattern, and in response to use the second synchronization pattern to identify groups of data words associated with an ordered plurality of pixel values produced by the first and second image sensors.

The pixel values may have a bit length differing from the second bit length and the de-multiplexer may be further operably configured to detect one or more data words in the data stream that correspond to at least a portion of a predefined third synchronization pattern, and in response to use the third synchronization pattern to separate pairs of pixel values within successive identified groups of data words, each pair of pixel values including one pixel value produced by the first image sensor and one pixel value produced by the second image sensor.

Other embodiments and features will become apparent to those ordinarily skilled in the art upon review of the following description of specific disclosed embodiments in conjunction with the accompanying figures.

BRIEF DESCRIPTION OF THE DRAWINGS

In drawings which illustrate disclosed embodiments.

DETAILED DESCRIPTION

Camera and Interface

Figure 1A:
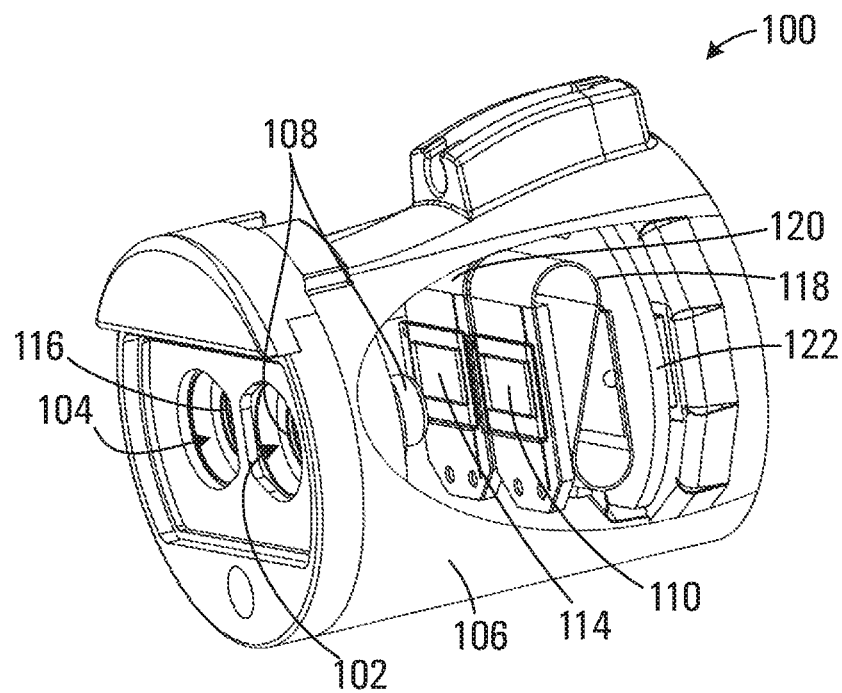
FIG. 1A is a front perspective view of a stereoscopic camera apparatus.
Figure 1B:
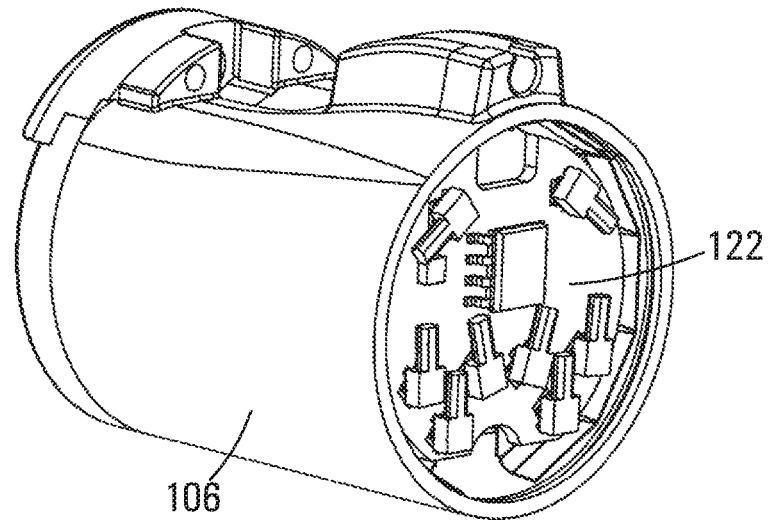
FIG. 1B is a rear perspective view of a stereoscopic camera apparatus.

A stereoscopic camera apparatus is shown generally at 100 in FIG. 1. Referring to FIG. 1A, the stereoscopic camera 100 includes two spaced apart imagers including an imager 102 and an imager 104, which are enclosed within a housing 106. The imager 102 includes a lens assembly 108 and a first image sensor 110 disposed to receive light captured from an object field. The imager 104 includes a lens assembly 112 and a second image sensor 114 disposed to receive light captured from the object field. The first and second image sensors 110 and 114 have different perspective viewpoints within the object field. Each image sensor 110 and 114 generates a plurality of pixel values representing images from the respective viewpoints.

The image sensors 110 and 114 are connected to an interface circuit apparatus 122 via respective flex circuits 118 and 120. The interface circuit 122 is shown from the rear in FIG. 1B and includes circuitry for receiving pixel values from the image sensors 110 and 114 and for producing a serial bitstream representing the images produced by the image sensors 110 and 114.

In one embodiment the image sensors 110 and 114 may be implemented using CMOS high density image sensors each having 1920×1080 pixels such as the OV2710 image sensor manufactured by OmniVision Technologies Inc. of Santa Clara, Calif., United States. The OV2710 image sensor produces 12-bit Bayer encoded RGB values representing each image pixel at a frame rate of 30 frames per second. The 12-bit pixel values include 10 bits for representing the pixel intensity and two synchronization bits VSync and HRef.

Figure 2:
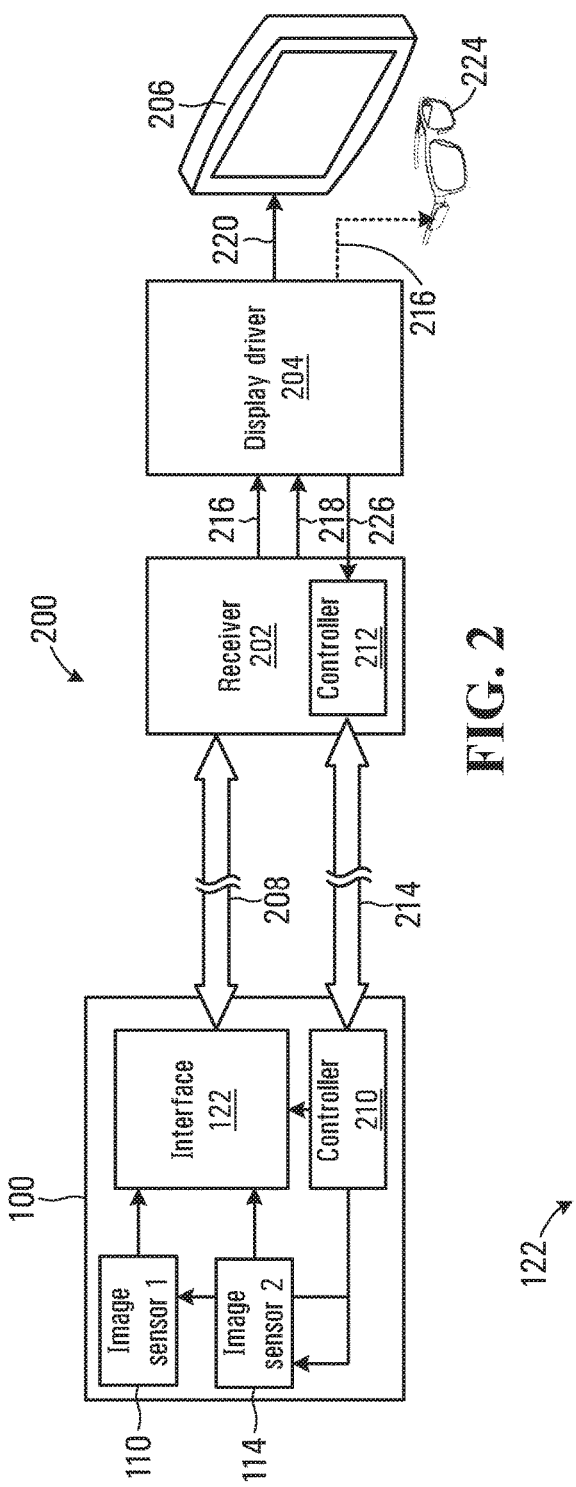
FIG. 2 is a block diagram of a stereoscopic imaging system.

Referring to FIG. 2, a block diagram of a stereoscopic imaging system is shown generally at 200. The imaging system 200 includes the stereoscopic camera 100, a receiver 202, and a display driver 204 for driving a 3D display 206. The interface circuit 122 of the stereoscopic camera 100 is connected to the receiver 202 via a datalink 208 for transmitting images captured by the first and second image sensors 110 and 114 to the receiver 202. The interface circuit 122 combines image data from the first and second image sensors 110 and 114 into a serial bitstream for transmission over the datalink 208. In one embodiment the stereoscopic camera 100 and receiver 202 may be spaced apart by several meters and the datalink 208 may be implemented using a relatively small diameter cable that transmits the serial bitstream from the stereoscopic camera 100 to the receiver 202.

The stereoscopic camera 100 includes a controller 210 for controlling operation of the image sensors 110 and 114 and the interface circuit 122. The receiver 202 also includes a controller 212 that is operable to control the receiver and to send commands to the controller 210 of the stereoscopic camera 100 via a control signal bus 214.

For implementations using the OV2710 image sensor the control signal bus 214 may carry power, clock signals and command signals from the controller 212 to the stereoscopic camera 100. For example, the control signal bus 214 may include a coaxial power cable that supplies 3.7 V power to the camera 100 via a shield of the cable and also carries data signals representing commands for programming the camera and a coaxial power cable that supplies 3.0 V power to the camera 100 via a shield of the cable and also delivers a clock signal for programming the camera. In one embodiment the programming of the camera 100 may be implemented using an Inter-Integrated Circuit (IIC) serial computer bus in which commands are sent downstream to the camera. The datalink 208 may include a pair of conductors for carrying a reference clock signal as a low-voltage differential signaling (LVDS) signal, for example. The reference clock signal is used to synchronize the interface circuit 122 for transmission of data between to the receiver 202. The datalink 208 may also include a pair of conductors for transmitting differential data signals upstream to the receiver 202. In other embodiments, the reference clock signal and data signal may be carried as a single-ended clock signals on coaxial cable rather than the pairs of conductors.

The receiver 202 receives the serial bitstream over the datalink 208, extracts the combined image data from the received bitstream, and generates separated image data streams 216 and 218 representing the images captured by first and second image sensors 110 and 114 from different perspective viewpoints. The display driver 204 receives the separated image data steams 216 and 218 and generates a display signal 220 in a format that is suitable for driving the 3D display 206. In one embodiment the display driver 204 produces a pair of serial digital interface (SDI) display signals for driving a dual input 3D display. In other embodiments the display driver 206 may further generate a signal 222 for driving a pair of viewing spectacles 224 for shuttering the images displayed by the 3D display 206 to produce 3D image effects.

Figure 3:
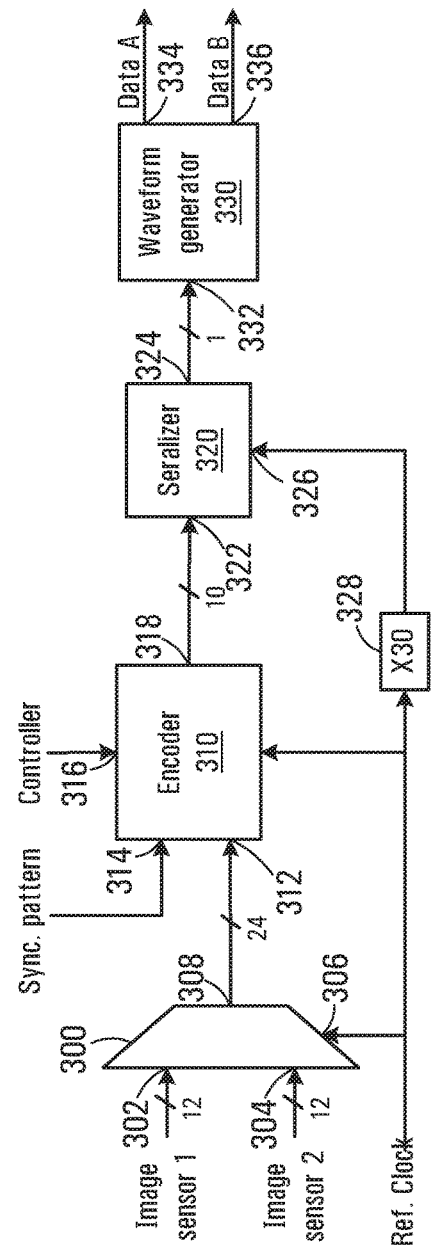
FIG. 3 is a schematic diagram of an interface circuit of the stereoscopic camera shown in FIG. 1.

The interface circuit apparatus 122 of the stereoscopic camera 100 is shown in greater detail in FIG. 3. Referring to FIG. 3, the interface circuit 122 includes a multiplexer 300 that has two inputs 302 and 304 for receiving pixel values from the respective first and second image sensors 110 and 114. In the embodiment shown the pixel values each have 12 bits (i.e. a 10 bit pixel intensity value, a VSync bit and a HRef bit). The multiplexer 300 also has a clock input 306 for receiving a reference clock signal. In one embodiment readout of the first and second image sensors 110 and 114 is synchronized to an 81 MHz reference clock signal, which is also used to clock the multiplexer 300. Corresponding pixel values from the first and second image sensors 110 and 114 are read out together as 12 bit parallel data values and presented to the respective inputs 302 and 306 of the multiplexer 300. The multiplexer 300 produces a 24 bit image stream at an output 308 representing successive pairs of corresponding pixels form the first image sensor 110 and second image sensor 114. The multiplexer 300 thus combines pixel values having a pixel bit length (12 bits in this embodiment) generated by each of the first and second image sensors 110 and 114 into a single image data stream. For the embodiment where the first and second image sensors 110 and 114 are synchronized to an 81 MHz reference clock signal, the 24 bit image stream will be produced at a corresponding 81 MHz data rate.

Figure 4:
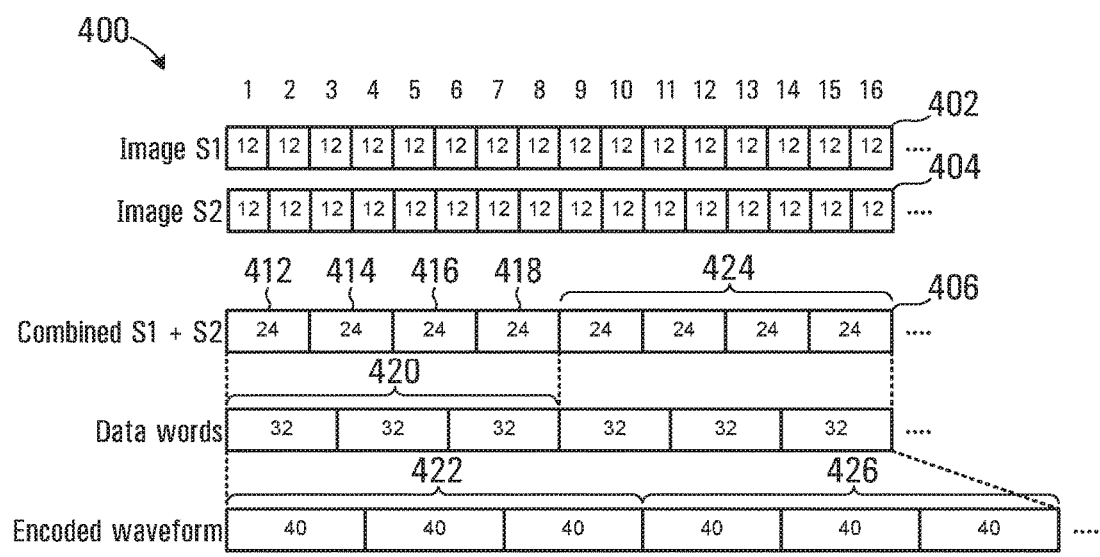
FIG. 4 is a representation of a portion of a pixel readout from a pair of image sensors of the stereoscopic camera apparatus shown in FIG. 1.

Referring to FIG. 4, a schematic representation of a portion of a pixel readout from the image sensors 110 and 114 is shown at 400. Sixteen successive pixel values from the first image sensor 110 are represented as 12 bit blocks at 402 and sixteen successive pixel values from the second image sensor 114 are represented as 12 bit blocks at 404. The output of the multiplexer 300 is shown at 406 as a plurality of 24 bit blocks of data, each including one pixel value from the first image sensor 110 and one pixel value from the second image sensor 114.

Referring back to FIG. 3, the interface circuit 122 also includes an encoder 310 having data inputs 312 and 314, a control signal input 316, and an output 318. The encoder 310 selectively receives a data input from either the output 308 of the multiplexer 300 or receives a synchronization pattern at the input 314 in response to a control signal received at the control signal input 316 from the controller 210. During normal operation, the control signal at the control signal input 316 causes the encoder 310 to select the data input 312 for receiving the 24 bit data stream from the multiplexer 300. During a synchronization phase, the control signal at the control signal input 316 causes the encoder 310 to select the data input 314 for receiving a synchronization pattern.

The encoder 310 encodes data received at the selected input and produces an encoded output at the output 318 that facilitates transmission as a direct current (DC) balanced waveform. A DC balanced waveform has no appreciable DC component of DC bias. When transmitting data waveforms at high bit rates, DC bias can be undesirable since it may cause saturation or change in the operating point of an amplifier at a receiver. A serial bitstream representing the 24 bit image stream would not necessarily have matching numbers of binary "1" and binary "0" values within any period of time, resulting in a changing DC component. There may also be insufficient transitions between binary "1" and binary "0" values over any period of time, potentially preventing effective clock recovery by a receiver. For example, a long bit sequences of binary "0" values may occur in image data. When transmitting data waveforms at high bit rates, clock jitter can be a problem for reliably decoding the received bitstream and it is generally advantageous to recover a clock signal from the received waveform. Successful clock recovery generally requires that there is sufficient transition density (i.e. transitions from a binary "1" to a binary "0" or vice versa) in the received waveform to enable synchronization of a locally generated clock to the received waveform.

There are many different encoding schemes that may be used to provide DC balanced bitstreams for transmission and also provide a sufficient transition density to enable clock recovery. Several such schemes rely on encoding data words using additional bits. The data words are thus encoded as bit sequences of an encoded bit length, where the encoded bit length is greater than the word bit length by one or more bits. One fairly widely used encoding scheme is 8B10B, which encodes 8 bit data words into 10 bit data sequences. The 10 bit data sequences are commonly referred to as symbols. By adding two extra bits the potential range of symbols is four times larger than for the 8 bit data sequences. Each possible 8 bit data sequence may thus be associated with two symbols, where the two symbols are selected to compensate for excessive "0" or "1" values in the 8 bit sequences. These two different symbols are referred to as having positive or negative disparity and the encoder 310 may be configured to keep track of a running disparity and select the appropriate symbol for the next 8 bit sequence to compensate for any disparity introduced by the previous symbol.

In this embodiment, the encoder 310 thus produces 10 bit 8B10B symbols at the output 318 that facilitate generation and transmission of an effectively DC-balanced waveform representing the image data. Additionally, through selection of values from this larger range of possible symbols, each 8 bit sequence can be encoded using a 10 bit symbol chosen to ensure that no more than five "0" values or five "1" values occur in a row, thus also providing a minimum transition density for clock recovery. The sequence of symbols produced at the output 318 of the encoder 310 are thus suitable for maintaining DC balance in a transmitted waveform and for recovery of the clock signal.

Referring to FIG. 4, in the embodiment shown the output 406 of the multiplexer 300 includes 24 bit blocks, which in an 8B10B encoding scheme will be represented as a series of 10 bit symbols.

As such, a first 24 bit block 412 will be represented by three 10 bit 8B10B encoded symbols, a second 24 bit block 414 by a three 10 bit 8B10B encoded symbols, a third 24 bit block 414 by a three 10 bit 8B10B encoded symbols, a fourth 24 bit block 414 by a further three 10 bit 8B10B encoded symbols, etc. Otherwise stated, the 24 bit blocks 412-418 may be thought of as comprising three 32 bit words (shown at 420) that are encoded using 8B10B encoding into three 40 bit words 422. Similarly, a remainder of the 12 bit blocks produced by the image sensors 110 and 114 may be thought of as a further three 32 bit words 424, which are encoded using 8B10B encoding into three 40 bit words 426. The words 422 and 426 thus include a successive plurality of symbols produced at the output 318 of the encoder 304 that are selected to produce a DC balanced waveform when transmitted.

Referring back to FIG. 3, the interface circuit 122 also includes a serializer 320 having a data input 322, a data output 324 and a clock input 326. The interface circuit 122 also includes a multiplier 328 for multiplying the reference clock signal by 30×. For an 81 MHz reference clock, the clock rate at the clock input 326 would thus be 2.43 GHz. The serializer 320 receives the 40 bit words including 10 bit encoded symbols from the output 318 of the encoder 310 and produces a serial bitstream at the output 324 having a data rate of 2.43 Gbits/second.

In one embodiment the multiplexer 300, encoder 310, and serializer 320 may be implemented using a field-programmable gate array (FPGA) configured to receive 12 bit parallel data streams at 81 MHz from the camera, transform the streams into a combined 24 bit parallel data stream at 81 MHz, and then transform the 24 bit stream into a 32 bit parallel data stream at 60.75 Mhz. The FPGA then encodes the 32 bit data stream into an 8B10B 40 bit parallel data stream, which is subsequently serialized for transmission at 2.43 Gbits/second.

The interface circuit 122 further includes a waveform generator 330 having an input 332 for receiving the serialized 8B10B encoded bitstream from the output 324 of the serializer 320. The waveform generator generates a transmission waveform representing the serial bitstream. In this embodiment the waveform generator 330 includes two differential data outputs 334 and 336 and the waveform generator includes an output driver (not shown) that produces a differential transmission waveform (Data A and Data B) at the outputs. In one embodiment the output driver may be implemented using pseudo emitter-coupled logic (PECL) for transmission over a pair of signal cables coupled to the respective outputs 334 and 336.

During synchronization of the system 200, the input 314 of the encoder 310 is selected and a synchronization pattern is presented at the input and encoded to produce 8B10B symbols representing the synchronization pattern at the output 318. The synchronization pattern is operable to facilitate extraction of pixel values from the bitstream at the receiver 202. In one embodiment, the controller 210 (shown in FIG. 2) initiates synchronization in response to a command received on the control signal bus 214 from the controller 212 of the receiver 202. The controller 210 then causes the encoder 310 to select the synchronization input 314 for encoding.

In one embodiment the synchronization pattern includes three patterns A, B and C. The synchronization patterns may include a bit sequences that are unlikely to be included in real image data, which facilitates detection by the receiver 202. The pattern A is an 8 bit sequence 1011 1100 (i.e. hexadecimal 0xBC), which is encoded in a common 8B10B schemes using either the 10 bit sequence "001111 1010" having a disparity of −1 or the 10 bit sequence "110000 0101" having a disparity of +1. In 8B10B encoding schemes the 0xBC symbol is usually reserved as a control character and includes five consecutive binary "0" bits or binary "1" bits. No other 8B10B symbol would have such a bit pattern, making the pattern A readily detectable in a received bitstream. In one embodiment sixteen of the 0xBC symbols are transmitted as synchronization pattern A, which when encoded by the encoder 310 are represented by one of the above 10 bit sequences, depending on the running disparity. The pattern A is repeated 16 times and enables the receiver 202 to determine boundaries of successive 8B10B symbols in the received bitstream.

The pattern B is a 32 bit sequence "0000 0000 0001 0010 0011 0100 0101 0110" (i.e. hexadecimal 0x00123456), which is selected as a pattern that would be very unlikely to occur in image data. The pattern B is repeated 16 times and encoded using 8B10B symbols and subsequently decoded at the receiver 202 back into the pattern B bitstream, which enables the receiver 202 to determine boundaries of successive 32 bit data words.

The pattern C is a 24 bit sequence "0001 0001 0010 0010 0011 0011" (i.e. hexadecimal 0x112233), which is selected as a pattern that would also be very unlikely to occur in image data. The pattern C is repeated 16 times and encoded using 8B10B symbols and then subsequently decoded at the receiver 202 back into the pattern C bitstream above. The pattern C enables the receiver 202 to determine boundaries of successive 24 bit data words. The synchronization process at the receiver 202 is described in more detail below.

Figure 5:
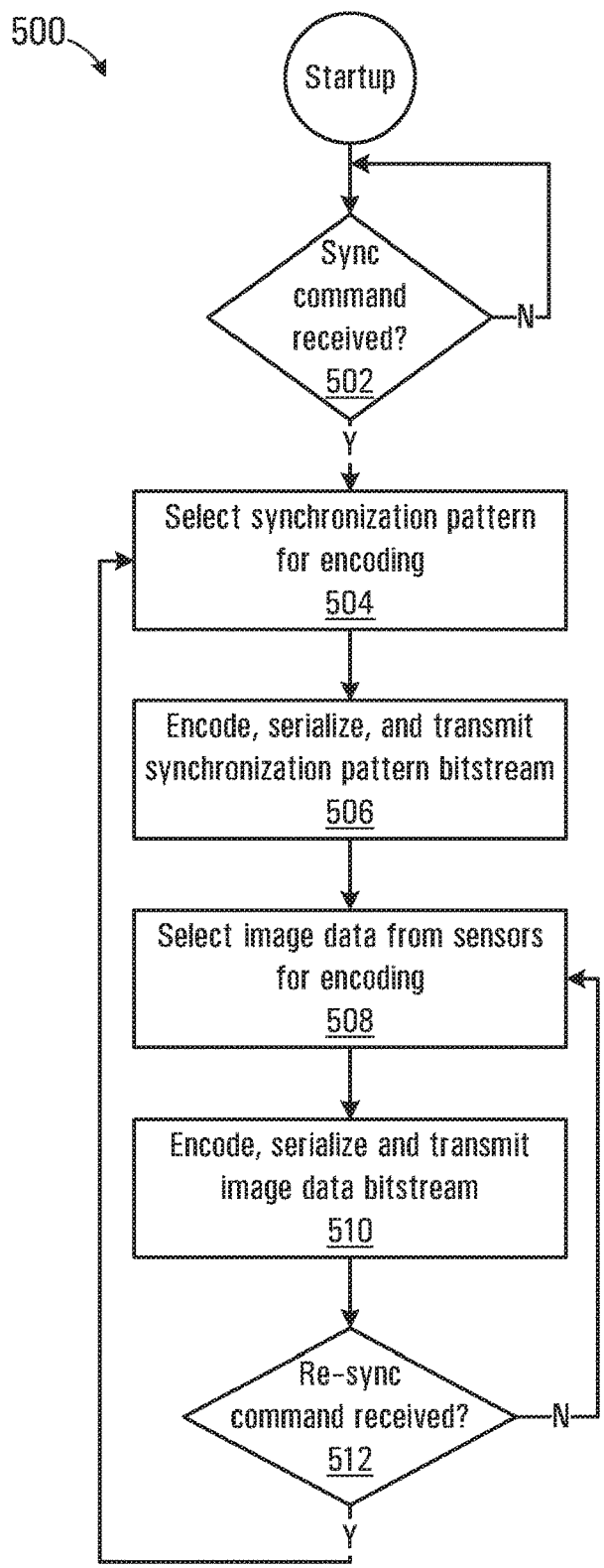
FIG. 5 is a process flowchart for a start-up process executed by the interface circuit shown in FIG. 3.

A startup process implemented by the interface circuit 122 is shown as a process flowchart in FIG. 5 at 500. The process begins at 502, where the controller 210 determines whether a synchronization (sync) command has been received on the control signal bus 214 from the receiver 202. If a sync command has not been received, the interface circuit 122 remains in startup mode. If a sync command is received from the receiver 202, the controller 210 causes the encoder 310 to select the input 314 of the serializer for encoding. As shown at block 506 the process continues with the encoder 310 encoding the synchronization pattern sequences into 8B10B symbols at the data output 324, which are serialized by the serializer 320 and transmitted by the waveform generator 330.

The process then continues at block 508 where the controller causes the encoder 310 to select the input 312 from the multiplexer 300 for receiving the 24 bit image data. As shown at block 510 the process then continues with the encoder 310 encoding the image data received from the multiplexer 300, which is serialized by the serializer 320 and transmitted by the waveform generator 330.

At block 512 the controller 210 determines whether a further synchronization (re-sync) command has been received on the control signal bus 214 from the receiver 202. The re-sync commend may be received if the receiver 202 loses synchronization. If a re-sync command has not been received, the interface circuit 122 continues to receive and transmit the image data bitstream at block 508. If a re-sync command is received from the receiver 202 the process returns to block 504 and the controller 210 causes the encoder 310 to again select the input 314 for encoding of the synchronization patterns A, B, and C for resynchronization.

In one embodiment the multiplexer 300, encoder 310, and serializer 320 may be implemented using an application specific integrated circuit or a programmable logic device such as a field-programmable gate array (FPGA).

Receiver

Figure 6:
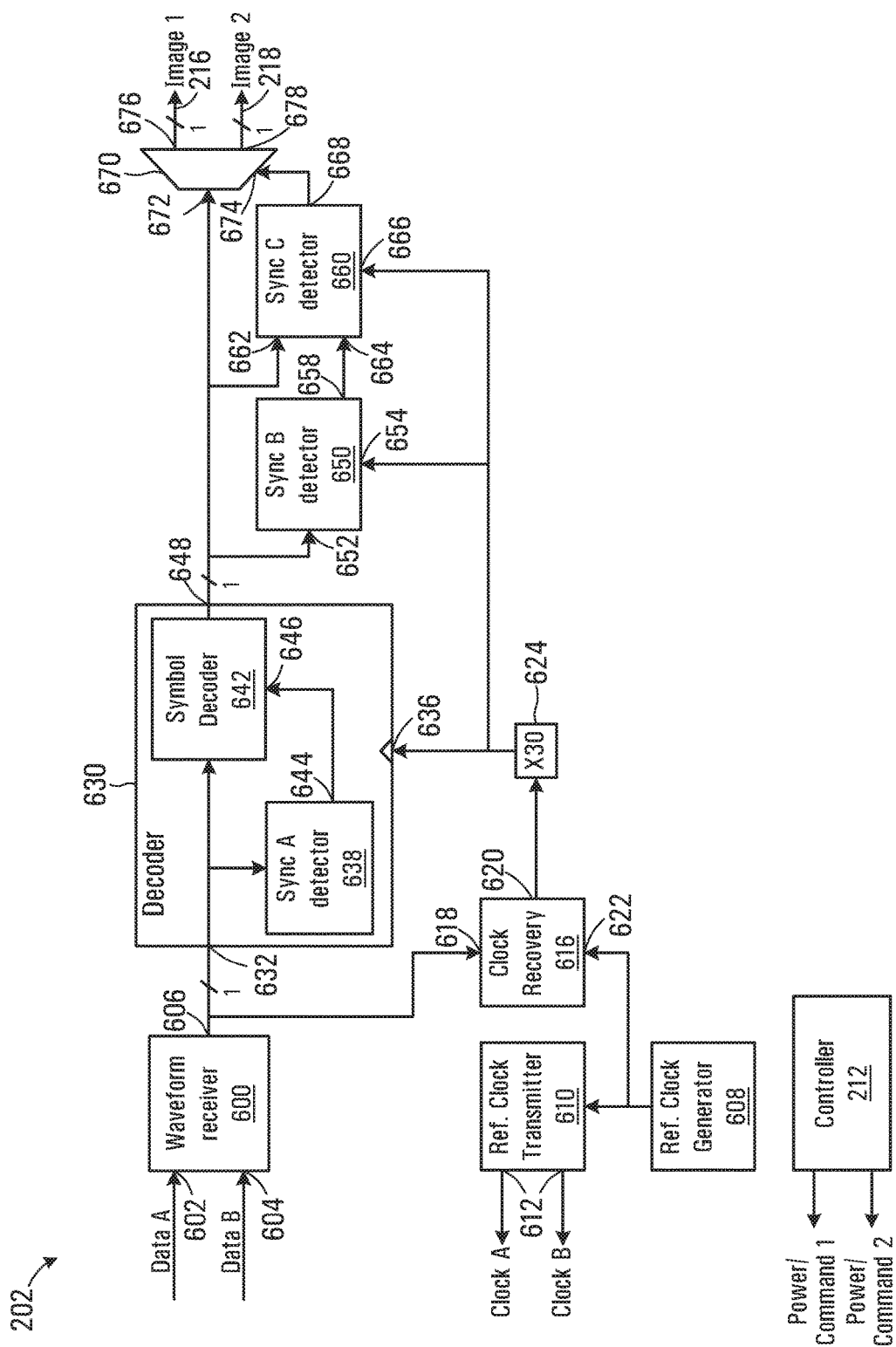
FIG. 6 is a schematic diagram of a receiver circuit of the stereoscopic imaging system shown in FIG. 2.

The receiver 202 is shown in greater detail in FIG. 6. Referring to FIG. 6, the receiver 202 includes a waveform receiver 600 having inputs 602 and 604 for receiving the differential data signals "Data A" and Data B" produced by the waveform generator 330 of the interface circuit 122. The waveform receiver 600 receives and conditions the differential signals and produces a digital signal representing the received bitstream at a bitstream output 606.

In this embodiment the receiver 202 includes a reference clock generator 608 for generating the reference clock for synchronizing operations of the receiver 202 and the camera 100. The receiver 202 further includes a reference clock transmitter 610 that includes an input 612 for receiving the reference clock from the reference clock generator 608 and a pair of differential outputs 614 for transmitting the reference clock to the camera 100. In one embodiment the reference clock may run at 81 MHz and may be transmitted using a low-voltage differential signaling (LVDS) communication protocol over a pair of signal lines that form part of the control signal bus 214.

The receiver 202 further includes a clock recovery circuit 616 for recovering a clock signal from the received bitstream. The clock recovery circuit 616 includes an input 618 for receiving the bitstream from the output 606 of the waveform receiver 600 and an input for receiving the reference clock signal from the reference clock transmitter 610. The clock recovery circuit 616 also has an output 620 for producing a synchronized clock output. In one embodiment the clock recovery circuit 616 includes a phase lock loop that phase-aligns the reference clock signal to bit transitions in the bitstream received at the input 618. The synchronized clock at the output 620 is thus aligned to the bitstream transitions and is operable to prevent clock jitter errors when extracting the image data from the received bitstream.

The receiver 202 includes a decoder 630 that has an input 632 for receiving the bitstream from the output 606 of the waveform receiver 600. The decoder 630 also includes a clock input 636 for receiving a multiplied clock signal from a 30× multiplier 624 (i.e. 2.43 GHz). The decoder 630 includes a synchronization detector 638, which receives the bitstream synchronized to the multiplied clock signal at the input 632, and scans for characters that correspond to the synchronization pattern A (i.e. five consecutive binary "0" bits or binary "1" bits). When the synchronization pattern A is detected, the synchronization detector 638 causes a symbol align signal to be asserted at an output 644.

The decoder 630 also includes a symbol decoder 642 that decodes the bitstream received at the input 632. The symbol decoder 642 thus decodes successive 10 bit serial data sequences into 8 bit data sequences at an output 648. The symbol decoder 642 includes an align input 646 for receiving the symbol align signal from the output 644 of the synchronization detector 638 indicating that the sync pattern A has been detected. When the decoder 630 is not yet synchronized, the decoded output at the output 648 will be garbled, since the decoder will not know where to separate the bitstream into 10 bit sequences for decoding. For decoding of meaningful image data the symbol decoder 642 needs to decode the same 10 bit data sequences that were encoded by the interface circuit 122 of the camera 100.

Figure 7:
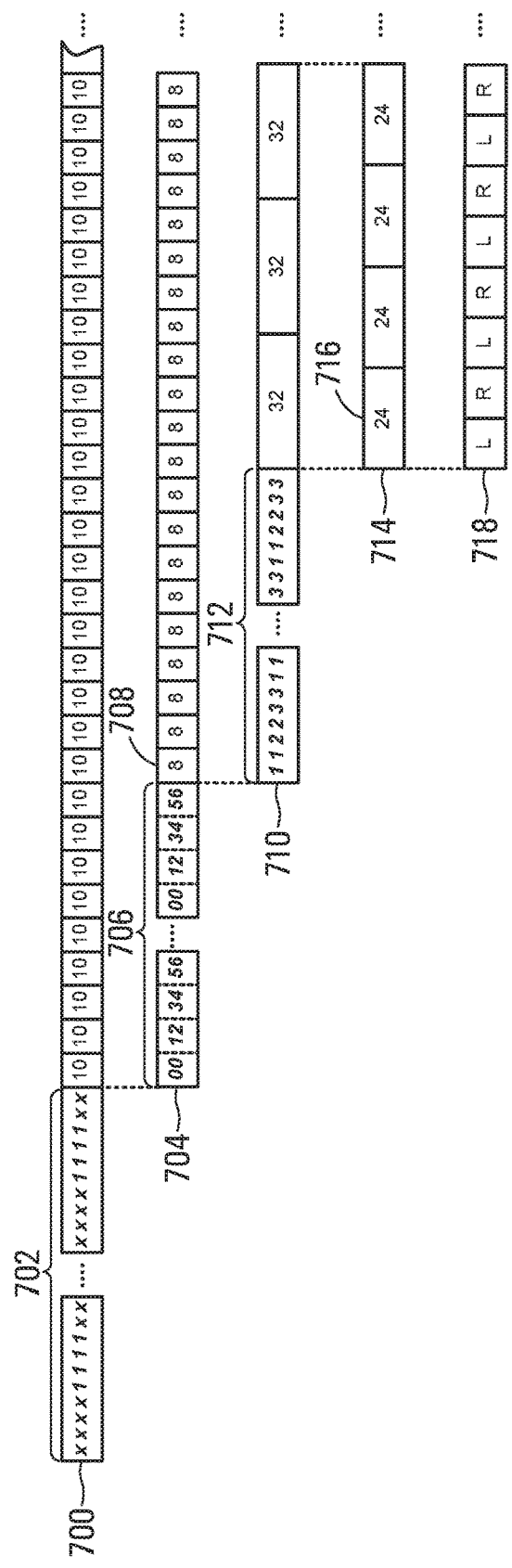
FIG. 7 is a representation of a portion of a bitstream received at the receiver shown in FIG. 6.

Referring to FIG. 7, a schematic representation of a portion of the bitstream received at the input 632 is shown at 700. When the synchronization detector 638 detects a "11111" or "00000" bit sequence (as shown at 702) in the received bitstream 700, the align signal is asserted at the output 644. The align signal when received by the symbol decoder 642 at the input 646 indicates where in the bitstream the boundaries of 10 bit symbols are located (i.e. in this case two don't-care ("x") characters after the "11111" pattern). The symbol decoder 642 is thus able to align to the received bitstream for decoding 10 bit symbols after this input has been received. The symbol decoder 642 then decodes successive 10 bit data sequences into the original 8 bit words that were encoded at the encoder 310 in FIG. 3 at the output 648. The 8 bit words are shown as blocks of 8 bit data sequences in FIG. 7 at 704. Since the synchronization pattern B directly follows the synchronization pattern A, the first 512 bits (i.e. 16× the 32 bit synchronization pattern B) will be decoded as shown at 706.

Referring back to FIG. 6, the receiver 202 further includes a sync B detector 650 that has an input 652 for receiving the bit sequence of 8 bit decoded words 704 from the output 648 of the decoder 630. The sync B detector 650 includes a clock input 654 for receiving the 30× recovered clock signal from the output 620 of the clock recovery circuit 616. The sync B detector 650 scans for bit sequences that correspond to the synchronization pattern B (i.e. the 32 bit value 0x00123456 repeated 16 times). The sync B detector 650 includes an output 658 that is asserted after 16 instances of the synchronization pattern B have been detected. Detection of the sync pattern B thus enables the decoded bitstream at the output 648 to be separated into groups of four 8 bit words that make up a 32 bit word as transmitted by the interface circuit 122. Referring to FIG. 7, the pattern B is shown at 706 in the 8 bit data sequences 704. Following receipt of the last "56" values of the pattern, the next 8 bit block will be the first 8 bit portion of a first 32 bit word 420 as shown in FIG. 4. As shown at 710 in FIG. 7, the synchronization pattern C (712) follows the pattern B and first 384 bits (i.e. 16×24 bits) contain the pattern C.

Referring back to FIG. 6, the receiver 202 further includes a sync C detector 660 that has an input 662 for receiving the bit sequence of 8 bit decoded words from the output 648 of the decoder 630. The sync C detector 660 also includes a clock input 656 for receiving the 30× recovered clock signal from the output 620 of the clock recovery circuit 616. The sync C detector 660 also includes an enable input 664 that when asserted causes the sync C detector 660 to scan for bit sequences that correspond to the synchronization pattern C (i.e. the 24 bit value 0x112233 repeated 16 times). The sync C detector 660 includes a start of image output 668 that is asserted after 16 instances of the synchronization pattern C have been detected in the bitstream. Referring to FIG. 7 at 714, the start of image output 668 is thus asserted when the synchronization patterns A, B, and C have been received in full following the 712 and indicates that the next 24 bit value 716 corresponds to the first pair of image pixels from the stereoscopic camera 100. As shown at 718, the lower 12 bits of the 24 bit sequence represent the first image pixel from the first image sensor 110 and the upper 12 bits represent the first image pixel from the second image sensor 114.

The receiver 202 also includes a de-multiplexer 670, which has an input 672 for receiving the bitstream output from the output 648 of the decoder 630. The de-multiplexer 670 also includes an input 674 for receiving the start of image signal from the output 668 from the sync C detector 660. The de-multiplexer 670 further includes an output 676 for producing the serial bitstream 216 of 12 bit pixel values 216 (shown in FIG. 2) associated with the image produced by the first image sensor 110. The de-multiplexer 670 also includes an output 678 for producing the serial bitstream of 12 bit pixel values 218 (shown in FIG. 2) associated with the image produced by the second image sensor 114. When the start of image signal is received at the input 674 the multiplexer 670 outputs the next 12 bits at the 216 and the subsequent 12 bits at the output 218. The de-multiplexer 670 then continues to direct successive 12 bit values to the respective outputs 676 and 678 generating separated image bitstream 216 and 218 that are received by the display driver 204 for driving the 3D display 206.

Referring back to FIG. 5, the startup process 500 executed by the interface circuit 122 of the stereoscopic camera 100 involves a step 512 in which it is determined whether a resynchronization command has been received from the receiver 202. The 12 bit pixel values transmitted each include horizontal and vertical synchronization bits, which are used to produce respective horizontal and vertical synchronization pulses in a display signal generated based on the image data. Referring to FIG. 2, in one embodiment the display driver 204 determines whether the horizontal and vertical synchronization signals have a timing that conforms with the timing expected for the specific format of the image. The image format will be generally known and transitions of the horizontal and vertical synchronization signals should occur at well-defined intervals within an allowable tolerance. If the transitions fall outside these tolerances the display driver 204 may cause a loss-of-sync signal 226 to be generated indicating that there is a loss of valid synchronization. When the controller 212 of the receiver 202 receives the loss-of-sync signal, the controller issues a synchronization command that is sent over the control signal bus 214 to the controller 210, which then executes the blocks 504-510 in order to re-synchronize the receiver 202 with the interface circuit 122.

While specific embodiments have been described and illustrated, such embodiments should be considered illustrative of the disclosure only and not as limiting the disclosure as construed in accordance with the accompanying claims.

What is claimed is:

1. A method for transmitting images captured by first and second image sensors having different perspective viewpoints within an object field, each image sensor generating a plurality of pixel values each represented by a plurality of data bits having a pixel bit length, the method comprising:
    combining pixel values generated by each of the first and second image sensors into a single image data stream including an ordered plurality of pixel values including pixel values generated by the first image sensor and pixel values generated by the second image sensor;
    transforming the single image data stream into a plurality of data words, each data word having a word bit length;
    encoding the data words using an encoding scheme that encodes each data word by selection of one of a plurality of symbols representing the data word, the symbols each having an encoded bit length that is at least one bit longer than the word bit length, the symbol selection being made to reduce a running disparity associated with the symbols;

serializing the symbols to generate a DC balanced serial bitstream;
causing a synchronization pattern to be inserted into the serial bitstream, the synchronization pattern being operable to facilitate extraction of pixel values from the serial bitstream; and
transmitting the serial bitstream,
wherein the synchronization pattern comprises at least:
a first synchronization pattern for facilitating determination of bit boundaries in the serial bitstream for extracting the symbols from the serial bitstream; and
a second synchronization pattern for identifying groups of data words associated with the ordered plurality of pixel values produced by the first and second image sensors.

2. The method of claim 1 wherein the word bit length is the same as the pixel bit length.

3. The method of claim 1 wherein the word bit length differs from the pixel bit length, and further comprising grouping a plurality of data words into data sequences prior to the encoding, the grouping being selected to cause the data sequence to have a bit length that is a multiple of the word bit length.

4. The method of claim 3 wherein:
the pixel bit length comprises 12 bits;
the word bit length comprises 8 bits; and
the encoded bit length comprises 10 bits.

5. The method of claim 4 wherein the serial bitstream is comprised of successive 40 bit data sequences including four encoded 10 bit symbols, wherein three successive 40 bit data sequences are used to encode three successive 32 bit data words, the three 32 bit data words each including four pixel values generated by the first image sensor and four pixel values generated by the second image sensor.

6. The method of claim 1 wherein the encoding scheme comprises an 8B10B encoding scheme.

7. The method of claim 1 wherein encoding the data words comprises encoding the data words using an encoding scheme that provides sufficient transition density to facilitate clock recovery from the bitstream.

8. The method of claim 1 wherein the synchronization pattern further comprises a third synchronization pattern for separating pairs of pixel values within successive identified groups of data words, each pair of pixel values including one pixel value produced by the first image sensor and one pixel value produced by the second image sensor.

9. The method of claim 1 wherein causing the synchronization pattern to be inserted comprises causing the synchronization pattern to be inserted into the bitstream in response to receiving a synchronization command.

10. The method of claim 1 wherein transmitting the bitstream comprises transmitting the bitstream using pseudo emitter coupled logic to generate a differential signal for transmission over a pair of signal conductors.

11. The method of claim 1 further comprising receiving a reference clock signal from a receiver for synchronizing timing of the transmission of the images.

12. The method of claim 11 wherein transmitting the bitstream comprises transmitting the bitstream at a baud rate that is a multiple of a clock rate of the reference clock signal.

13. A method for synchronizing a receiver for extracting image data from a received bitstream, the bitstream including symbols having a first bit length and encoding image data representing images captured by first and second image sensors having different perspective viewpoints within an object field, the image data including pixel values generated by each of the first and second image sensors, the method comprising:
in response to detecting a bit pattern in the bitstream that corresponds to at least a portion of a predefined first synchronization pattern, using the first synchronization pattern to determine bit boundaries for extracting the symbols from the bitstream;
decoding the extracted symbols to produce a data stream including a plurality of data words having a second bit length, the first bit length being longer than the second bit length by at least one bit included to facilitate DC balancing of the bitstream for transmission; and
in response to detecting one or more data words in the data stream having a bit pattern that corresponds to at least a portion of a predefined second synchronization pattern, using the second synchronization pattern to identify groups of data words associated with an ordered plurality of pixel values produced by the first and second image sensors.

14. The method of claim 13 wherein the pixel values have a bit length equal to the second bit length and wherein each group of data words includes at least one pair of pixel values including one pixel value produced by the first image sensor and one pixel value produced by the second image sensor.

15. The method of claim 13 wherein the pixel values have a bit length differing from the second bit length and further comprising in response to detecting one or more data words in the data stream that correspond to at least a portion of a predefined third synchronization pattern, using the third synchronization pattern to separate pairs of pixel values within successive identified groups of data words, each pair of pixel values including one pixel value produced by the first image sensor and one pixel value produced by the second image sensor.

16. The method of claim 13 wherein the first synchronization pattern and the second synchronization pattern include a sequence of bits in the respective bit patterns that is unlikely to be encountered within the image data.

17. The method of claim 16 wherein the first synchronization pattern comprises one of:
a plurality of successive bits having a binary value of 0; or
a plurality of successive bits having a binary value of 1.

18. The method of claim 13 wherein the receiver generates a clock signal for synchronizing receiver functions and further comprising causing the clock signal to be synchronized with the bitstream, the bitstream having being encoded to have a sufficient transition density to facilitate clock recovery from the bitstream.

19. The method of claim 13 wherein the symbols encoding the image data comprise symbols selected to maintain DC-balance for transmission of the bitstream.

20. The method of claim 19, wherein the bitstream is received from a transmitter located proximate the first and second image sensors and further comprising causing the receiver to transmit a synchronization command to the transmitter to elicit transmission of the first synchronization pattern and the second synchronization pattern within the bitstream.

21. The method of claim 20 wherein causing the receiver to transmit the synchronization command comprises causing the receiver to transmit a synchronization command when initiating operations for receiving image data or when detecting loss of synchronization of the bitstream at the receiver.

22. The method of claim 21 wherein the pixel values each include horizontal and vertical synchronization bits that are used to produce respective horizontal and vertical synchronization pulses in a display signal generated based on the image data, and wherein detecting loss of synchronization of the bitstream comprises detecting loss of valid horizontal and vertical synchronization pulses signals in the display signal.

23. An interface apparatus for transmitting images captured by first and second image sensors having different perspective viewpoints within an object field, each image sensor generating a plurality of pixel values each represented by a plurality of data bits having a pixel bit length, the apparatus comprising:

logic circuitry configured to:
combine pixel values generated by each of the first and second image sensors into a single image data stream including an ordered plurality of pixel values including pixel values generated by the first image sensor and pixel values generated by the second image sensor;
transform the single image data stream into a plurality of data words, each data word having a word bit length;
encode the data words using an encoding scheme that encodes each data word by selection of one of a plurality of symbols representing the data word, the symbols each having an encoded bit length that is at least one bit longer than the word bit length, the symbol selection being made to reduce a running disparity associated with the symbols;
serialize the symbols to generate a DC balanced serial bitstream; and
insert a synchronization pattern into the serial bitstream, the synchronization pattern comprising at least a first synchronization pattern configured to facilitate determination of boundaries between successive symbols in the serial bitstream and a second synchronization pattern configured to facilitate determination of boundaries between successive data words associated with the plurality of pixel values generated by the first and second image sensors; and
a waveform generator configured to transmit the serial bitstream.

24. The apparatus of claim 23 wherein the word bit length differs from the pixel bit length, and wherein the logic circuitry is further configured to group a plurality of data words into data sequences prior to the encoding, the grouping being selected to cause the data sequence to have a bit length that is a multiple of the word bit length.

25. The apparatus of claim 23 wherein the synchronization pattern further comprises a third synchronization pattern configured to facilitate separation of pairs of pixels values within the successive data words, each pair of pixel values including one pixel value produced by the first image sensor and one pixel value produced by the second image sensor.

26. An apparatus for receiving and extracting image data from a received bitstream, the bitstream including symbols having a first bit length and encoding image data representing images captured by first and second image sensors having different perspective viewpoints within an object field, the image data including pixel values generated by each of the first and second image sensors, the apparatus comprising:

a decoder configured to:
detect a bit pattern in the bitstream that corresponds to at least a portion of a predefined first synchronization pattern, and in response to use the first synchronization pattern to determine bit boundaries for extracting the symbols from the bitstream; and
decode the extracted symbols to produce a data stream including a plurality of data words having a second bit length, the first bit length being longer than the second bit length by at least one bit included to facilitate DC balancing of the bitstream for transmission; and
a de-multiplexer configured to:
detect one or more data words in the data stream having a bit pattern that corresponds to at least a portion of a predefined second synchronization pattern, and in response to use the second synchronization pattern to identify groups of data words associated with an ordered plurality of pixel values produced by the first and second image sensors.

27. The apparatus of claim 26 wherein the pixel values have a bit length differing from the second bit length and wherein the de-multiplexer is further configured to detect one or more data words in the data stream that correspond to at least a portion of a predefined third synchronization pattern, and in response to use the third synchronization pattern to separate pairs of pixel values within successive identified groups of data words, each pair of pixel values including one pixel value produced by the first image sensor and one pixel value produced by the second image sensor.

* * * * *